Oct. 30, 1973  B. G. BJALME  3,769,393

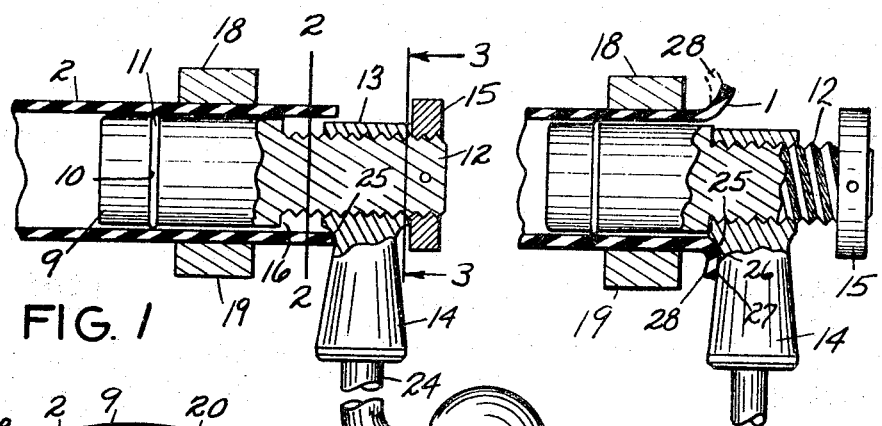
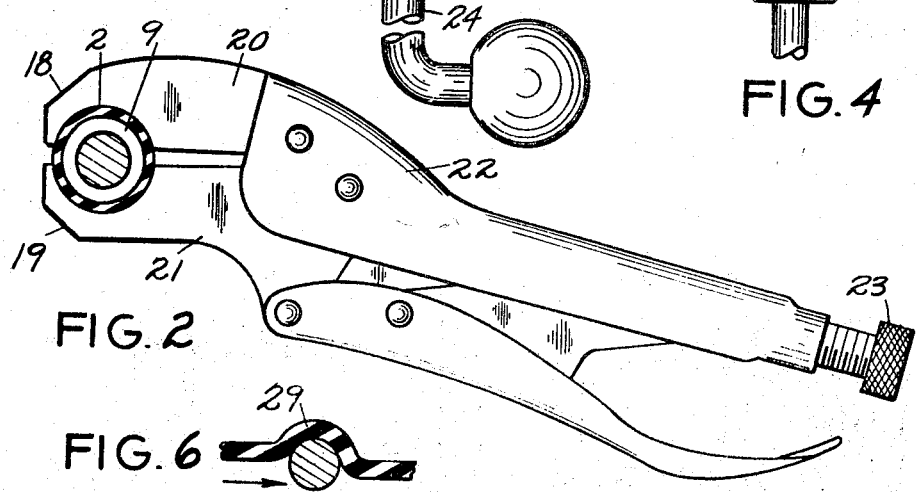
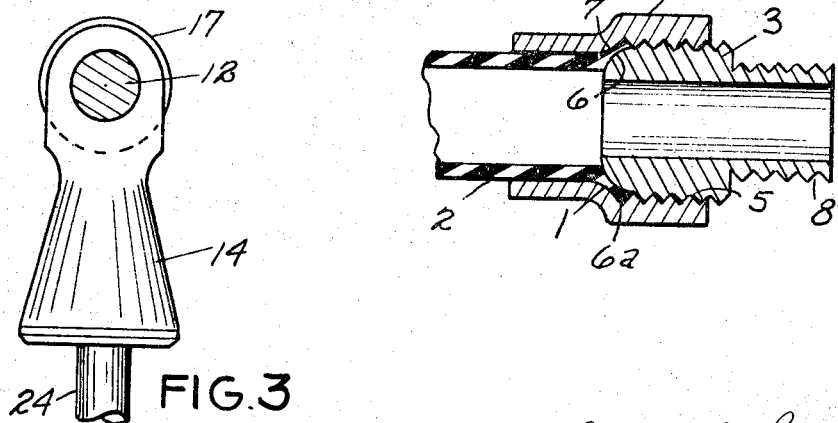

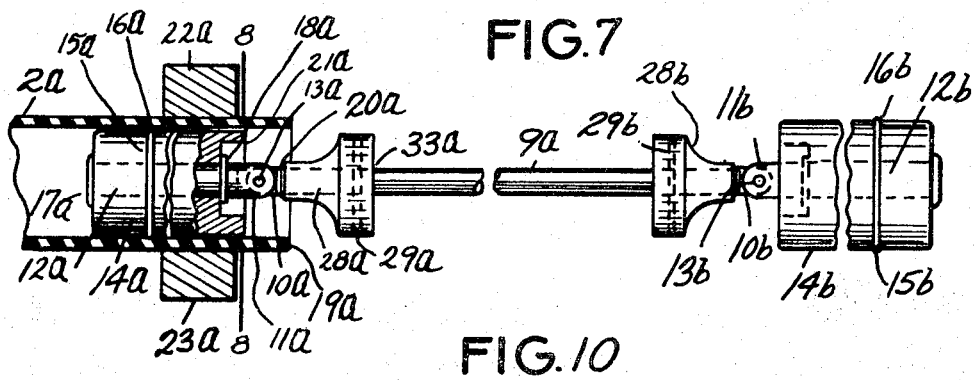
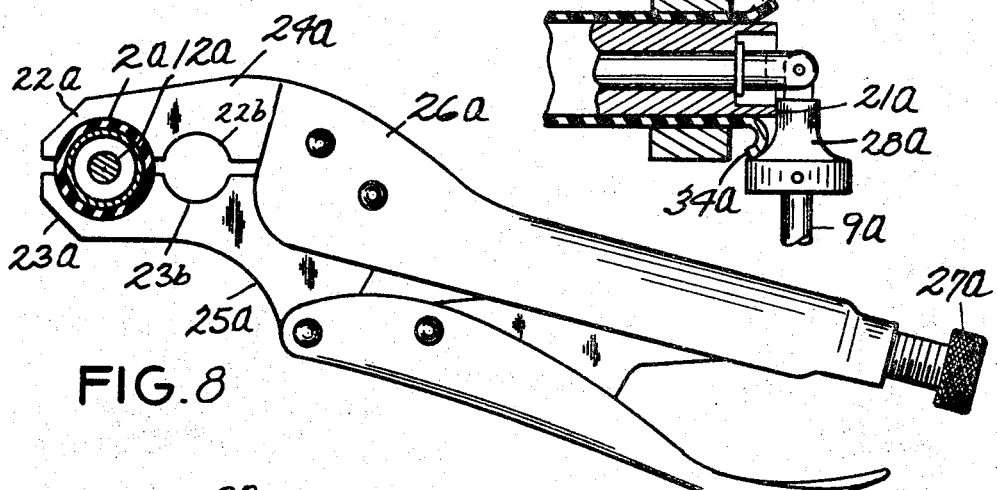
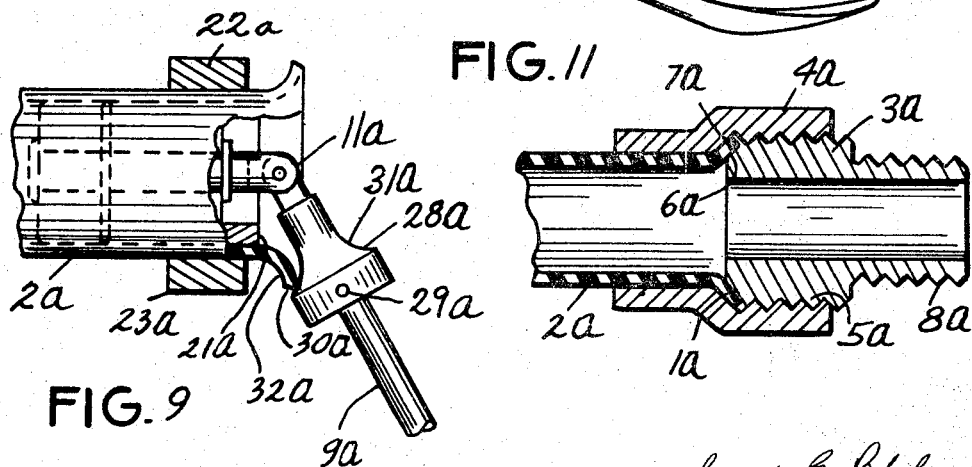

METHOD OF FLARING PLASTIC PIPE

Original Filed Jan. 20, 1971  4 Sheets-Sheet 3

Bengt G. Bjalme
By Ralph Hammar
Attorney

United States Patent Office 3,769,393
Patented Oct. 30, 1973

3,769,393
METHOD OF FLARING PLASTIC PIPE
Bengt G. Bjalme, Erie, Pa., assignor to Reed
Manufacturing Company, Erie, Pa.
Continuation of abandoned application Ser. No. 107,898, Jan. 20, 1971. This application Apr. 11, 1972, Ser. No. 243,087
Int. Cl. B29c 17/02
U.S. Cl. 264—68                                       8 Claims

ABSTRACT OF THE DISCLOSURE

A method of flaring thermoplastic pipe such as polybutylene, polyethylene, polyvinyl, etc., used for domestic water service in which the flaring is accomplished by a spinning tool rotated about the axis of the pipe. The flare is effected by local deformation accompanied by heating by internal and external friction in the plastic which overcomes the memory of the plastic. The flare may fit a standard compression or recessed fitting.

---

This is a continuation of application Ser. No. 107,898, filed Jan. 20, 1971, now abandoned.

This application is a division of application Ser. No. 828,260 (Pat. 3,601,852) and also illustrates apparatus of applications Ser. Nos. 796,518 (Pat. 3,585,687, 837,413 (now abandoned) and 854,060 (Pat. 3,584,344) for carrying out the method.

In a preferred form, this invention is intended to flare rigid and flexible thermoplastic synthetic resin pipe or tubing such as used for gas and water service. The term "thermoplastic(s)" is used in the specification and claims in the same sense as in the plastics industry, namely to identify plastics (polymers) which are permanently fusible and retain their ability to be repeatedly formed by heat and pressure. The term "thermoplastic(s) excludes (a) thermosetting plastics which cure by cross linking as in the vulcanization of natural rubber and are permanently infusible, (b) metal, and (c) paper; Encyclopedia of Chemical Technology, vol. 10, pp. 798–799, Plastics Copyright 1953; Polymeric Materials, Charles C. Winding, Gordon D. Hiatt, 1961, McGraw-Hill. Such thermoplastic resin when deflected tends to return to its undeflected state because of its memory. The flaring is effected by a spinning tool rotatably supported by an internal arbor or mandrel anchored in the bore of the pipe. The tool contacts the projecting end of the pipe and forces the pipe end into a flare as the tool sweeps around the pipe end. The internal heating due to repeated fluxing of the plastic at the areas of contact with the spinning tool is effective in overcoming the memory of the plastic and causing the plastic to flow and take a permanent set.

Figure 16:
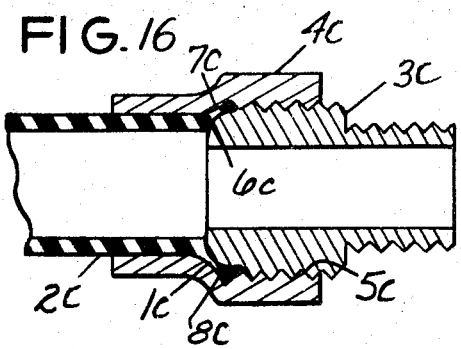
Figure 12:
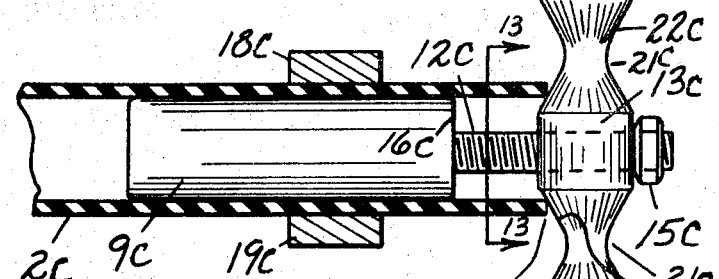
Figure 13:
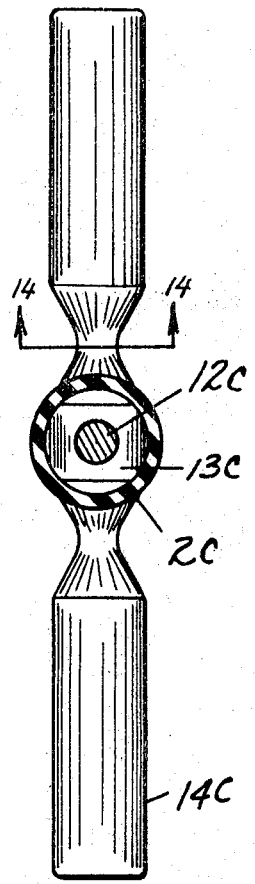
Figure 15:
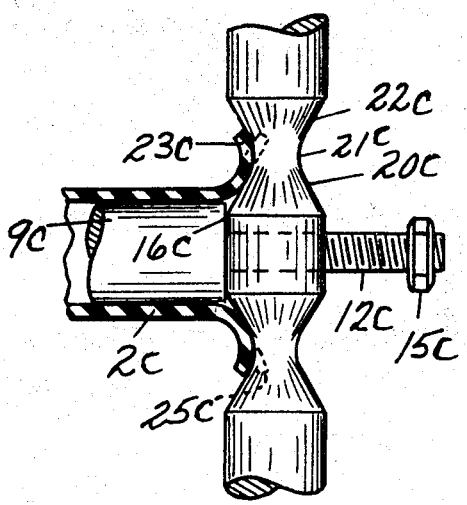
Figure 17:
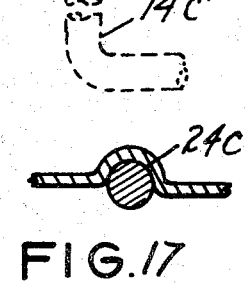
Figure 14:
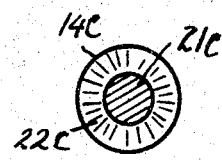
Figure 18:
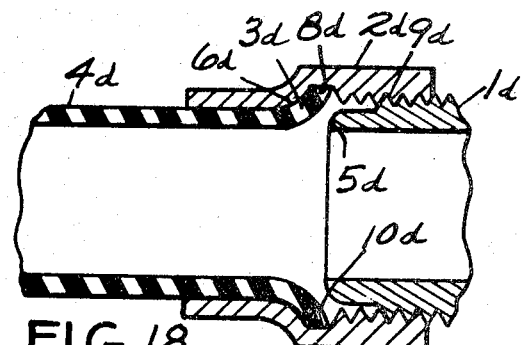
Figure 19:
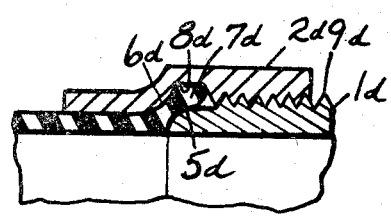
Figures 20, 21:
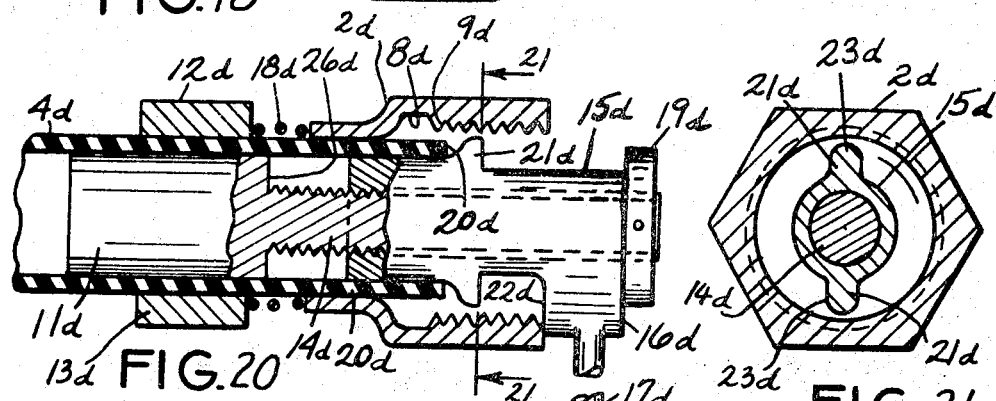
Figure 22:
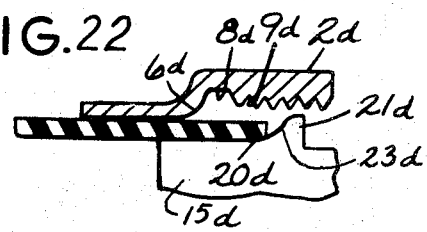
Figure 23:
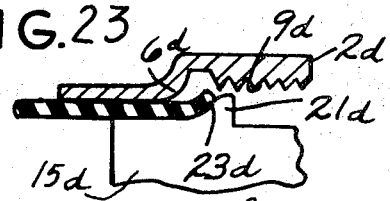

In the drawing, FIG. 1 is a side elevation, partly in section, showing the tool inserted in a pipe end in readiness for a flaring operation; FIG. 2 is a section on line 2—2 of FIG. 1; FIG. 3 is a section on line 3—3 of FIG. 1; FIG. 4 is a sectional view showing the position of the tool at the end of the flaring operation; FIG. 5 is a section through a pipe end flared with the tool and installed in a standard flare fitting such as used by American Water Works Association and others; FIG. 6 is a diagrammatic view illustrating the action of the tool; FIG. 7 is a side elevation, partly in section, showing a modified form of the tool inserted in a pipe end in readiness for a flaring operation; FIG. 8 is a section on line 8—8 of FIG. 7; FIG. 9 is a fragmentary view showing the position of the flaring tool midway in the flaring operation; FIG. 10 is a sectional view similar to FIG. 9 showing the position of the tool at the end of the flaring operation; FIG. 11 is a section through a pipe end flared with the tool of FIGS. 7–9 and installed in a standard compression flare fitting; FIG. 12 is a side elevation partly in section showing another modification of the tool inserted in a pipe end in readiness for a flaring operation; FIG. 13 is a section on line 13—13 of FIG. 12; FIG. 14 is a section on line 14—14 of FIG. 13; FIG. 15 is a fragmentary sectional view showing the position of the tool at the end of the flaring operation; FIG. 16 is a section through a pipe end flared with the tool of FIGS. 12–15 and installed in a standard flare fitting such as used by the American Water Works Association and others; FIG. 17 is a diagrammatic view illustrating the action of the tool; FIG. 18 is a longitudinal section through a fitting on a flared pipe end prior to tightening; FIG. 19 is a fragmentary section after tightening the FIG. 18 fitting; FIG. 20 is a longitudinal section through the tool for forming the flare; FIG. 21 is a section on line 21—21 of FIG. 20; and FIGS. 22–26 inclusive are fragmentary sections showing successive stages in the forming of the flare.

The particular tool illustrated in FIGS. 1–4 inclusive is intended to produce a flared end 1 on a pipe 2 of flexible thermoplastic such as polybutylene, polyethylene, polyvinyl, etc. Such plastic pipe is difficult to flare because the plastic resists flowing and tends to return to its initial unflared shape by reason of its memory. Heretofore, for polyethylene and rigid polyvinyl, hot flaring tools have been used in which the section to be flared is heated above its softening point. Heretofore it has been considered that polyvinyl and polyethylene could not be cold flared. For polybutylene, cold flaring has been used but the flares have been weak and the effort required has been huge.

The flared end is required for the standard A.W.W.A. type fitting comprising an inner member 3 and an outer member 4. The outer member is in the form of a nut screwed onto threads 5 on the inner member. As the fitting is tightened, the flared end is squeezed between opposed convex surfaces 6 and 7 respectively on the inner and outer members. The inner member 3 has a threaded projection 8 for connection to a water service line. The fitting part 3 is standard for copper tubing for which the plastic tubing 2 is a replacement. The fitting part 4 has convex surface 7 to adapt it to plastic tubing. The opposed convex surfaces 6, 7 cooperate to form a bead 6a which holds the tubing in place under pull-out forces.

The tool shown in FIGS. 1–4 inclusive has a cylindrical arbor or plug 9 having a sliding fit in the bore of the pipe or tubing 2 to be flared. The plug has an external groove 10 receiving an expansible split ring 11 which in its unstressed conditions is sufficiently larger than the bore of the pipe 2 so that it always provides a friction grip tending to hold the plug in place even though the pipe is over or under size. The plug has a reduced diameter externally threaded projection 12 on which is screwed the hub 13 of a flaring head 14. Rotation relative to the projection 12 causes the tool to move axially between a collar 15 pinned to the outer end of the projection and an annular shoulder 16 at the inner end of the projection. In order to insure the proper size of flare, the flaring head is rotated until it stops against the collar 15 and the plug is inserted in the bore of the pipe until the end 17 of the pipe stops against the flaring head 14. The free or unsupported pipe end projecting beyond the annular shoulder 16 on the plug 9 provides the proper material allowance for the flare. When the plug is adjusted to the position, clamping jaws 18 and 19 are tightened against the outside of the pipe, clamping the pipe between the jaws and the plug and rigidly supporting the pipe behind the annular shoulder 16. Substantially the entire section of the pipe between the plug and the jaws is subjected to a radical clamping pressure. The jaws 18 and 19 are conveniently attached to the stationary and movable jaw members 20 and 21 of a toggle wrench or vise grip pliers 22. This permits quick clamping and unclamping and ready adjustment by means of screw 23 for variations in the wall thickness or diameter of the pipe. The jaws 18, 19 can be on any suitable clamp or vise. After clamping, the jaws 18, 19, the plug 9 and the intervening wall of the pipe section are in fixed relation to each other.

After the jaws 18, 19 are tightened, the free end of the pipe is flared by rotating the flaring head 14 in the direction to feed the tool axially toward the pipe. This is conveniently done by a crank arm or handle 24 fixed to the flaring head. The initial contact of the pipe end 17 is with the inclined surface 25 which diverges outward and away from the pipe end at an acute angle to the axis of the pipe. As the flaring progresses, the pipe end successively contacts reverse curved or concave surface 26 and then surface 27 which is inclined at an obtuse angle to the axis of the pipe. This results in local overflaring of the pipe with the outer edge or rim 28 of the flare tending to curl as shown in FIG. 4. The flaring head exerts both an axial and a radial force on the pipe end so the plastic in the flare is both stretched to a larger diameter and compressed toward the portion of pipe gripped between the jaws 18, 19 and the plug.

As the spinning tool or flaring head 14 sweeps about the axis of the pipe it exerts a local flaring pressure on the pipe end deflecting the plastic in contact with the tool both axially and radially out of line with the adjoining portion of the pipe end as shown at 29 in FIG. 6. As the tool passes one section and starts to deflect an adjoining section, the previously deflected section tends to return to its undeflected position. The tool causes a local back and forth movement of the plastic which generates interal heating of the plastic which reduces the tendency of the plastic to spring back. At each point of contact, the plastic is locally deformed by the pressure exerted by the flaring head and as the head sweeps past, the plastic does not return completely. The flare is accordingly made progressively in a plurality of revolutions. An apparently rigid plastic such a polyvinyl is very easily flared, as are the other thermoplastics used for water service such as polyethylene, polybutylene, etc. Thermoplastics do not have a yield point, as is the case with metals. Even after huge deflections there is no permanent set. The plastic by reason of its memory tends to return to the undeflected position. However, the local internal heating resulting from the spining tool overcomes the memory and results in a permanent flare. At the end of the flaring operation, the hub 13 of the flaring head is in contact with the annular stop surface 16. At this stage, rotation of the tool is reversed to return it to the original position. There is some frictional contact with the flared rim at the initial reversal which improves the quality of the flare. At the top of FIG. 4, the flare is shown in its final position after the spring back of the plastic from the over flared condition. This results in a finished flare which will fit the standard flare fitting for tubing. Preferably the rim 28 of the flare has a diameter slightly greater than the inside diameter of the threads in the nut 4 of the fitting so the rim of the flare will be under both radial and axial compression when installed.

At the end of the flaring operation, the flare will be warm to touch. This indicates that there is a localized heating at the regions of contact of the spinning tool with the pipe end which causes local flowing of the pipe end and produces a sort of permanent set which reduces the amount of spring back at the end of the flaring operation. The flares produced by this tool are stronger than the pipe. The axial compression of the flare may contribute to the strength. In the previous flaring tools used for plastic water pipe, after assembly into a flare fitting as shown in FIG. 5, stress on the pipe always caused breaking at the flare. With the flare produced by the tool of this application, stress on the pipe produces breakage in the pipe itself rather than in the flare. Not only is the flare produced by the tool stronger than previous flares, but the power required to produce a flare is very slight compared to the power requirements for previous flaring tools.

Because the wall of the pipe adjacent the end being flared is securely clamped between the internal arbor or plug 9 and the external clamp 18, 19, the flares produced by the tool are very uniform. The action of the flaring head is confined to the unsupported projecting end of the pipe.

The tool is adapted to produce flares on all sizes of thermoplastic pipe and for all standard flare fittings. No special fittings are required.

The flares produced by the tool are uniform. The collar 15 accurately controls the material allowance to be used for the flares. The shoulder 16 accurately terminates the flare. The screw threads on projection 12 provide a uniform feed rate preventing wrinkling of the material.

The flares are made quickly and with little effort. The number of turns of the tool required to produce a flare varies with the amount of plastic to be displaced. For 1¼ inch polybutylene tubing used for service entrance from water distribution lines, acceptable flares have been made with 14 revolutions of the flaring tool and in twenty seconds or less. The torque required increased as the flare was being made because of the larger amount of plastic being deflected. The maximum torque for the fourteenth revolution was 135 pound-inches. At the seventh revolution the torque was 75 pound-inches.

The heat developed by this tool is due to external and internal friction and is sufficient to heat the immediate contacting surfaces between the pipe and the tool. There is no overall softening of the plastic.

In use, the contact between the flaring head and the pipe is confined to the surfaces 25, 26, 27 (FIG. 4), each of which is of arcuate cross section. The curved or outwardly flaring surfaces 26, 27 produce an improved flare. The contact with the plastic is confined to a narrow section of the surfaces approaching line contact. The plastic in contact with the tool is deflected both axially and radially. While the tool is shown as of roughly frusto conical shape, this is not necessary. The portions of the tool out of contact with the pipe may obviously be of any suitable shape having the required strength.

By appropriate changes in dimensions to increase the amount of over-flare, it is possible to over flare the pipe to such an extent that the flare has a 180° reverse curve with the rim extending backward from the end of the pipe.

The tool shown in FIGS. 7–10 inclusive is duplex or double ended, one end being used to produce a flare on one size of pipe and the other end to produce a flare on another size of pipe. Corresponding parts on the other end will be indicated by the reference numerals for one end with the subscript b. The tool comprises a crank arm 9a having a slotted end 10a to receive a tongue 11a on a pine 12a and pivoted to the tongue by a pin 13a. The pin 13a hinges or pivots the arm 9a for movement about an axis transverse to the axis of the pipe. At the opposite end, the crank arm has a slotted end 10b to receive a tongue 11b on a pin 12b and pivoted to the ears 11b by a pin 13b. The crank arm can be pivoted between positions in line with the pins 12a and 12b to positions substantially at right angles to the pins 12a and 12b. The pin 12a is journaled in a cylindrical plug 14a having a sliding fit in the bore of the pipe or tubing 2a to be flared. The pin 12b is similarly journaled in a plug 14b received in the bore of a pipe of different size. The plug 14a has an external groove 15a receiving an expansible split ring 16a which in its unstressed condition is sufficiently larger than the bore of the pipe 2a so that it always provides a friction grip tending to hold the plug in place even though the pipe is over or under size. The plug is confined between a head 17a and a retaining washer 18a on the pin 12a. In order to insure the proper size of flare, the plug is inserted in the bore of the pipe until the end 19a of the pipe is opposite a groove or gage mark 20a in the arm or rod 9a. This provides the proper amount of free or unsupported pipe end projecting beyond the annular stop surface 21a on the plug 14a. When the plug is adjusted to this position, clamping jaws 22a and 23a are tightened against the outside of the pipe, clamping the pipe between the jaws and the plug and rigidly supporting the pipe behind the annular stop surface 21a. The jaws 22a and 23a are conveniently attached to the stationary and movable jaw members 24a and 25a of a toggle wrench or vise grip pliers 26a. This permits quick clamping and unclamping and ready adjustment by means of screw 27a for variations in the wall thickness or diameter of the pipe.

At the start of the flaring operation, the rod 9a is pivoted about pin 13a bringing the external surface of a spinning member 28a into initial contact with the end 19a of the pipe at an acute angle to the axis of the pipe. The spinning member 28a is preferably made as a separate part fixed to the rod by a pin 29a so that it may be readily replaced if necessary. The spinning member is preferably of circular radial cross section and of concave axial cross section so the diameter of the member increases with the distance from its pivot. The rod 9a is then rotated, using the plug 14b at the opposite end as a crank handle while continually exerting an axial pressure tending to increase the angle between the crank arm 9a and the axis of the plug 14a. This causes the spinning tool to sweep about the axis of the pipe and to exert a local flaring pressure on the pipe end. When the tube is half way flared, the arm 9a is in the position shown in FIG. 9 where the partially flared end 30a is in contact with an outwardly flaring or concave surface 31a which tends to curl the rim 32a of the flare. The curved or outwardly flaring surface 31a produces an improved flare over that obtained by a straight cylindrical surface on the spinning tool 28a such as indicated by dotted lines 33a. While the outwardly flaring surface 31a is preferable, the straight cylindrical surface 33a produces an acceptable flare. At the end of the flaring operation, the flaring tool 28a is in contact with the annular stop surface 21a. This limits the position of the crank arm 9a to substantially 90° to the axis of the pipe. At the bottom of FIG. 10, the curl 34a indicates a slight over flaring. At the top of FIG. 10, the flare is shown in its final position after the spring back of the plastic from the over flared condition. This results in a finished flare which will fit the standard compression fitting.

The tool at the opposite end of the crank arm 9a where the parts are designated by the same reference numerals with the subscript b, has the same mode of operation for a different size pipe. In addition to the advantage of being able to flare two sizes of pipe with a single tool, in each case, the plug at the free end of the crank arm serves as a crank handle for rotating the spinning tool about the axis of the pipe in order to produce the flare.

The flare can be readily adjusted by the depth of the insertion of the plug into the pipe to be flared. This permits adjustment of the tool to the properties of various plastics.

The tool shown in FIGS. 12–15 inclusive has a cylindrical arbor or plug 9c having a sliding fit in the bore of the pipe or tubing 2c to be flared. The plug has a reduced diameter externally threaded projection 12c on which is screwed the hub 13c of a flaring head having diametrically opposed spokes or handle projections 14c. The handle is conveniently made from bar stock. For sizes of pipe one inch or larger a handle extension 14c' may be provided. The plug 9c and handle 14c form a T with the handle being the head and the plug the stem of the T. Rotation of the hub relative to the projection 12c causes it to move axially between a collar 15c pinned to the outer end of the projection and an annular shoulder 16c at the inner end of the projection. In order to insure the proper size of flare, the flaring head is rotated until the hub 13c stops against the collar 15c and the plug is inserted in the bore of the pipe until the end 17c of the pipe stops against the hub as shown in FIG. 12. The free or unsupported pipe end projecting beyond the annular shoulder 16c on the plug 9c provides the piper material allowance for the flare. When the plug is adjusted to the described position, clamping jaws 18c and 19c are tightened against the outside of the pipe, clamping the pipe between the jaws and the plug and rigidly supporting the pipe behind the annular shoulder 16c. Substantially the entire section of the pipe between the plug and the jaws is subjected to a radial clamping pressure. The jaws 18c, 19c can be on any suitable pliers, clamp or vise. After clamping, the jaws 18c, 19c, the plug 9c and the intervening wall of the pipe section are in fixed relation to each other.

After the jaws 18c, 19c are tightened, the free end of the pipe is flared by rotating the flaring head in the direction to feed the tool axially toward the pipe. This is conveniently done by the handle projections 14c. The initial contact of the pipe end 17c is with the inclined surface 20c which diverges outward and away from the pipe end at an acute angle to the axis of the pipe. As the flaring progresses, the pipe end successively contacts reverse curved or concave surface 21c and then surface 22c which is inclined at an obtuse angle to the axis of the pipe. This results in local overflaring of the pipe with the outer edge or rim 23c of the flare tending to curl as shown in FIG. 15. The flaring head exerts both an axial and a radial force on the pipe end so the plastic in the flare is both stretched to a larger diameter and compressed toward the portion of pipe gripped between the jaws 18c, 19c and the plug. For ease of machining, the surfaces 20c and 22c are conical. The surface 21c is a radius connecting the conical surfaces. The surfaces 20c, 21c and 22c are convex in circumferential cross section.

As the spinning tool or flaring head 14 sweeps about the axis of the pipe it exerts a local flaring pressure on the pipe end deflecting the plastic in contact with the tool both axially and radially out of line with the remainder of the pipe end as shown at 24c in FIG. 17. As the tool passes one section and start to deflect an adjoining section, the previously deflected section tends to return to its undeflected position. The tool causes a local back and forth movement or flexing of the plastic which generates internal heating of the plastic which reduces the tendency of the plastic to spring back. At each point of contact, the plastic is locally deformed by the pressure exerted by the flaring head and as the head sweeps past, the plastic does not return completely. The flare is accordingly made progressively in a plurality of revolutions. At the end of the flaring operation, the hub 13c of the flaring head is in contact with the annular stop surface 16c. At this stage, rotation of the tool is reversed to return it to the original position.

In use, the contact between the flaring head and the pipe is confined to the surfaces 20c, 21c, 22c (FIG. 14), each of which is of arcuate cross section. The contact with the plastic is confined to a narrow section of the surfaces approaching line contact as shown in FIG. 17. The plastic in contact with the tool is deflected both axially and radially. While the tool is shown as having conical surfaces, this is not necessary. The portions of the tool out of contact with the pipe may obviously be of any suitable shape having the required strength.

In FIGS. 18–24 is shown a recessed fitting which comprises inner and outer members 1d and 2d which are screwed together to capture a flare 3d on a pipe 4d of thermoplastic such as rigid polyvinyl, polyethylene, polybutylene, etc. The inner and outer members have opposed convex sealing surfaces 5d and 6d which, as the fitting is tightened, engage the midportion of the flare 3d and squeeze the outer portion of the flare into a bead 7d filling a reentrant groove 8d in front of sealing surface 6d and of greater diameter than the root diameter of the threads 9d on the outer member or nut 2d. The bead 7d forms a positive lock which increases substantially the pull out strength of the flare. While this type of fitting has desirable strength characteristics, it has the disadvantage that the flare must be formed in the particular nut or outer member 2d with which it is to be used since the rim 10d of the flare is so much larger than the inside diameter of the threads 9d that the flare cannot be formed outside the nut and then assembled into the nut. Heretofore, the flaring operation has had to be performed by hot flaring devices where the plastic is heated above its softening point. In accordance with the structure to be described, the flare is formed by a cold flaring operation which is much quicker and simpler than the previously known hot flaring.

The tool for cold flaring the pipe end has an arbor 11d which is slidably received in the end of a pipe to be flared and is rigidly held in place by clamping jaws 12d, 13d which may, for example, be similar to those of FIG. 2. When the jaws are clamped, the intervening wall of the pipe is rigidly fixed. The arbor has an integral screw threaded extension 14d on which is screwed the hub 15d of the flaring tool. The extension 14d supports the hub and also pipe end, the outer member or nut 2d of the fitting is assembled on the pipe end. After the jaws 12d, 13d are clamped on the pipe, the nut 2d is trapped between the jaws 12d, 13d and a projection 18d receiving a crank arm 17d by which the hub is turned. A spring 18d may be arranged between the jaws and the nut to urge the nut away from the jaws. The spring is not necessary.

At the start of the flaring operation, the hub is rotated to move it against a stop 19d fixed to the projection 14d for the purpose of positioning the hub of the flaring tool so as to make a flare of the proper dimensions. In this position the free end 20d of the pipe is stopped against one or more circumferentially spaced spinning projections 21d which clear the threads 9d on the nut 2d and the inner end of the hub 15d is telescoped within and has a running clearance with and supports the free end of the pipe. A single projection 21d may be used.

Figure 24:
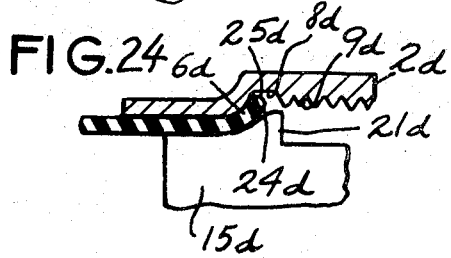
Figure 25:
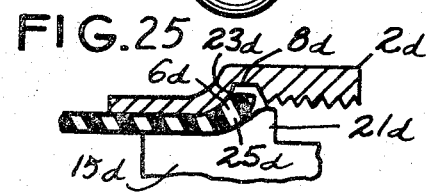
Figure 26:
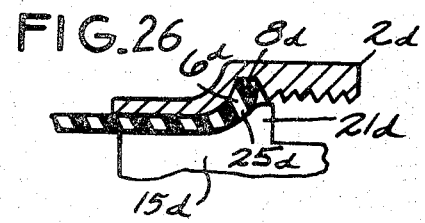

The surfaces of projection 21d which contact and form the pipe end into a flare are contoured to exert both radial and axial pressure. As the tool is rotated about and advanced along the axis of the pipe, the outer end of the pipe is locally flexed, causing heating of the plastic by internal friction which overcomes its memory and causes the plastic to take a permanent set as described further in connection with FIGS. 1-6. FIGS. 22-26 inclusive show successive stages in the tube flaring operation. At the start of the flaring operation shown in FIG. 22, the pipe end 20d to be flared extends past a few of the threads 9d on the nut 2d and stops against the projection 21d which is received within the bore of the nut. The initial contact between the pipe end 20d and the projection 21d occurs at surface 23d which is rounded when viewed in a plane at right angles to the axis of the pipe (FIG. 21) and concave and generally complementary to the surface 6d when viewed in a plane including the axis of the pipe. The effect of the surface 23d is to flow the pipe end 20d both radially outward and axially inward as shown in the second stage of the forming operation in FIG. 23. The inner end of the hub 15d telescoped within the pipe end prevents inward movement of the plastic. The rim of the pipe end is locally stretched by engagement with the surface or surfaces 23d. The concave shape of the surfaces 23d provides progressive increase in the flaring action. For the first few turns of the handle 17d, the nut 2d is held tightly against a stop 22d on the hub 16d either manually or by spring 18d. After the first few turns of the handle, the rim 24d enters the groove 8d as shown in FIG. 24. The nut 2d is now released and allowed to move freely during the succeeding rotation of the tool during which additional material from the pipe end is moved into the flare. Upon continued advance of the tool as shown in FIGS. 25 and 26, the flare 25d is conformed to the groove 8d. At the end of the flaring operation (FIG. 26), the inner end of hub 15d is stopped against shoulder 26d and the flare 25d of plastic has been bulged still further outward so as to substantially fill the groove 8d in the nut. In one size of tool for one inch plastic pipe, two turns were required for reaching the FIG. 24 stage where the flared section had entered the groove 8d and 7¼ turns were required to complete the flaring operation. These figures are by way of example and not of limitation. Upon backing the tool off to return it to the starting position, the section 25d forms a completed flare which has its maximum outside diameter greater than the inside diameter of the threads 9d so that the nut is anchored on the pipe end by the interlocking engagement of the flare 25d with the groove 8d. There is some spring back of the flare but not enough to clear the threads 9d. The nut is free to turn or swivel on the pipe.

In the use of the tool, the hub 15d is unscrewed to its starting position against stop 19d, the nut 2d is assembled on the pipe end, the arbor 11d is inserted in the pipe until the outer end stops against projection 21d, the jaws 12d, 13d are clamped against the section of pipe opposite the arbor, the nut 2d is held lightly against the stop 22d, and the hub is rotated by crank 17d to advance the projection 21d into the nut and form the flare. When the hub 15d stops against shoulder 26d, the rotation is reversed to return the hub to stop 19d and the jaws 12d, 13d are unclamped to permit removal of the tool.

What is claimed is:

1. The method of flaring the end of a pipe of thermoplastic synthetic resin having a memory causing it when deflected to tend to return to its undeflected shape, said flare being produced by the effect of a plurality of successive steps which individually act on a limited portion of the circumference of the pipe end and cumulatively act on the entire circumference of the pipe end, each step comprising exerting a radially outward pressure on a local portion of the pipe end which occupies a minor portion of the circumference of the pipe end to deflect said local portion outward radially out of line with the portion of the pipe end adjoining said local portion, the deflection of said local portion causing heating of the plastic in the deflected portion by internal friction to overcome said memory and thereby to reduce the tendency of the deflected portion to spring back, said heating being low enough to maintain the temperature of the deflected portion below the softening point of the thermoplastic.

2. The method of claim 1 in which the inner and outer surfaces of the pipe adjacent the pipe end to be flared are tightly held while the pipe end is being flared.

3. The method of claim 1 in which said pressure is exerted by a tool having a surface transverse to the axis of the pipe locally engaging a minor portion of the circumference of the wall of the free end of the pipe.

4. The method of claim 3 in which the angle between said surface of the tool and the axis of the pipe in an acute angle adjacent the bore of the pipe and the angle progressively increases radially outward from the bore of the pipe.

5. The method of claim 3 in which the flare is completed by progressively forming the pipe end to a flare by relative rotation and axial movement of said tool and the free end of the pipe while maintaining said pressure.

6. The method of claim 1 in which said pressure is exerted both radially outward and axially inward.

7. The method of claim 6 in which said pressure is exerted by a tool having a surface transverse to the axis of the pipe locally engaging a minor portion of the circumference of the wall of the free end of the pipe.

8. The method of claim 7 in which the flare is completed by progressively forming the pipe end to a flare by relative rotation and axial movement of said tool and the free end of the pipe while maintaining said pressure.

References Cited

UNITED STATES PATENTS

| | | | |
|---|---|---|---|
| 2,169,315 | 8/1939 | Yngve | 264—68 X |
| 1,732,324 | 10/1929 | Beardsley | 18—19 |
| 2,286,692 | 6/1942 | Smith | 18—19 |
| 3,435,109 | 3/1969 | Flaming | 264—322 |
| 3,205,289 | 9/1965 | Carpenter | 264—280 |
| 3,254,147 | 5/1966 | Nakada | 264—296 X |

ROBERT F. WHITE, Primary Examiner

R. R. KUCIA, Assistant Examiner

U.S. Cl. X.R.

264—296, 310, 322